United States Patent
Kushner et al.

(10) Patent No.: US 9,581,034 B2
(45) Date of Patent: Feb. 28, 2017

(54) TURBOMACHINERY STATIONARY VANE ARRANGEMENT FOR DISK AND BLADE EXCITATION REDUCTION AND PHASE CANCELLATION

(71) Applicant: Elliott Company, Jeannette, PA (US)

(72) Inventors: Francis Kushner, Delmont, PA (US); Brian Christopher Pettinato, Greensburg, PA (US)

(73) Assignee: Elliott Company, Jeannette, PA (US)

( * ) Notice: Subject to any disclaimer, the term of this patent is extended or adjusted under 35 U.S.C. 154(b) by 831 days.

(21) Appl. No.: 13/804,179

(22) Filed: Mar. 14, 2013

(65) Prior Publication Data
US 2014/0322001 A1    Oct. 30, 2014

(51) Int. Cl.
  *F01D 9/04*   (2006.01)
  *F01D 5/14*   (2006.01)
  (Continued)

(52) U.S. Cl.
  CPC ............ *F01D 9/041* (2013.01); *F01D 5/142* (2013.01); *F01D 5/145* (2013.01); *F01D 5/16* (2013.01);
  (Continued)

(58) Field of Classification Search
  CPC .......... F01D 9/041; F01D 5/142; F01D 5/145; F01D 5/16; F04D 29/4213; F04D 29/444;
  (Continued)

(56) References Cited

U.S. PATENT DOCUMENTS

| | | |
|---|---|---|
| 910,266 A | 1/1909 | Belluzzo |
| 1,534,721 A | 4/1925 | Lasche |

(Continued)

FOREIGN PATENT DOCUMENTS

| | | |
|---|---|---|
| DE | 19936507 A1 | 2/2001 |
| EP | 1077310 A1 | 2/2001 |

(Continued)

OTHER PUBLICATIONS

Clark, J.P., Design Strategies to Mitigate Unsteady Forcing (Preprint), Air Force Research Laboratory, Propulsion Directorate, Turbine Branch, Turbine Engine Division, Apr. 2008, 56 pages, AFRL-RZ-WP-TP-2008-2112.

(Continued)

*Primary Examiner* — Alexander Comley
(74) *Attorney, Agent, or Firm* — The Webb Law Firm

(57) ABSTRACT

A turbomachine includes a plurality of rotating blades adjacent to a plurality of stationary vanes attached to a stationary casing. Stationary vanes are spaced apart circumferentially with equal spacing around an inner perimeter of the casing. Optionally, stationary vanes are offset radially and/or circumferentially. Stationary vanes may alternate with leading and/or trailing edges at different distances from the rotating blades. In one embodiment, stationary vanes have tapered leading and/or trailing edge angles to homogenize flow and reduce stator wake excitation, flow excitation, and acoustic excitation due to interaction with spinning modes of acoustic pressure pulsations at rotating blade passing frequency. Tapered trailing edges are arranged such that they are inclined at mutually opposing angles to reduce rotor blade and/or disk excitation by: a) homogenizing the successive wakes within the flow stream, and b) reducing the effect of vortices shed-off the stationary vanes on acoustic modes of the gas within the casing.

18 Claims, 7 Drawing Sheets

(51) Int. Cl.
*F01D 5/16* (2006.01)
*F04D 29/044* (2006.01)
*F04D 29/68* (2006.01)
*F04D 29/42* (2006.01)
*F04D 29/44* (2006.01)
*F04D 29/54* (2006.01)

(52) U.S. Cl.
CPC ....... *F04D 29/4213* (2013.01); *F04D 29/444* (2013.01); *F04D 29/544* (2013.01); *F04D 29/681* (2013.01); *F05D 2240/122* (2013.01); *F05D 2250/51* (2013.01); *F05D 2260/961* (2013.01); *Y02T 50/671* (2013.01); *Y02T 50/673* (2013.01)

(58) Field of Classification Search
CPC .. F04D 29/544; F04D 29/681; F05D 2250/51; F05D 2240/122; F05D 2260/961; Y02T 50/671; Y02T 50/673
See application file for complete search history.

(56) References Cited

U.S. PATENT DOCUMENTS

| | | | |
|---|---|---|---|
| 2,798,661 A * | 7/1957 | Willenbrock, Jr. | F02C 7/04 114/20.2 |
| 2,918,254 A | 12/1959 | Hausammann | |
| 3,572,960 A * | 3/1971 | McBride | F01D 5/14 415/115 |
| 6,017,187 A | 1/2000 | Mueller | |
| 6,082,966 A * | 7/2000 | Hall | F01D 9/041 415/208.2 |
| 6,139,266 A | 10/2000 | Nagaoka et al. | |
| 6,374,611 B2 | 4/2002 | Doring et al. | |
| 6,409,465 B1 | 6/2002 | von Flotow et al. | |
| 6,439,838 B1 | 8/2002 | Crall et al. | |
| 6,471,475 B1 | 10/2002 | Sasu et al. | |
| 6,554,564 B1 | 4/2003 | Lord | |
| 6,726,445 B2 | 4/2004 | Tsuchiya et al. | |
| 7,189,059 B2 | 3/2007 | Barton et al. | |
| 7,444,802 B2 * | 11/2008 | Parry | F01D 5/10 415/160 |
| 2003/0152456 A1 * | 8/2003 | Guemmer | F01D 5/145 415/151 |
| 2003/0152459 A1 * | 8/2003 | Gliebe | F01D 5/141 415/211.2 |
| 2006/0275110 A1 * | 12/2006 | Baralon | F01D 9/041 415/191 |
| 2007/0274826 A1 | 11/2007 | Kuhnel et al. | |
| 2009/0169371 A1 * | 7/2009 | Tsuchiya | F01D 5/141 415/193 |
| 2009/0257866 A1 * | 10/2009 | Greim | F01D 5/141 415/208.1 |
| 2010/0322774 A1 * | 12/2010 | Morrison | F01D 5/141 416/223 A |
| 2012/0328432 A1 * | 12/2012 | Ramakrishnan | F01D 5/146 416/1 |
| 2013/0094942 A1 * | 4/2013 | MacKay | F01D 5/141 415/148 |

FOREIGN PATENT DOCUMENTS

| | | | | |
|---|---|---|---|---|
| EP | 2522809 A2 | 11/2012 | | |
| EP | 2685050 A1 | 1/2014 | | |
| FR | 2681644 A1 | 3/1993 | | |
| GB | 2475140 A | 5/2011 | | |
| IT | WO 2013018073 A1 * | 2/2013 | ............. | F01D 9/04 |
| JP | 60169699 A | 9/1985 | | |
| JP | 5133396 A | 5/1993 | | |
| WO | 2013018073 A1 | 2/2013 | | |

OTHER PUBLICATIONS

Rao et al., Active Flow Control to Reduce Fan Blade Vibration and Noise, AIAA/CEAS Aeroacoustic Conference, American Institute of Aeronautics & Astronautics, May 10-12, 1999, pp. 57-65, AIAA-99-1806.

Tyler et al., Axial Flow Compressor Noise Studies, SAE Transactions, 1962, pp. 309-332, vol. 70.

* cited by examiner

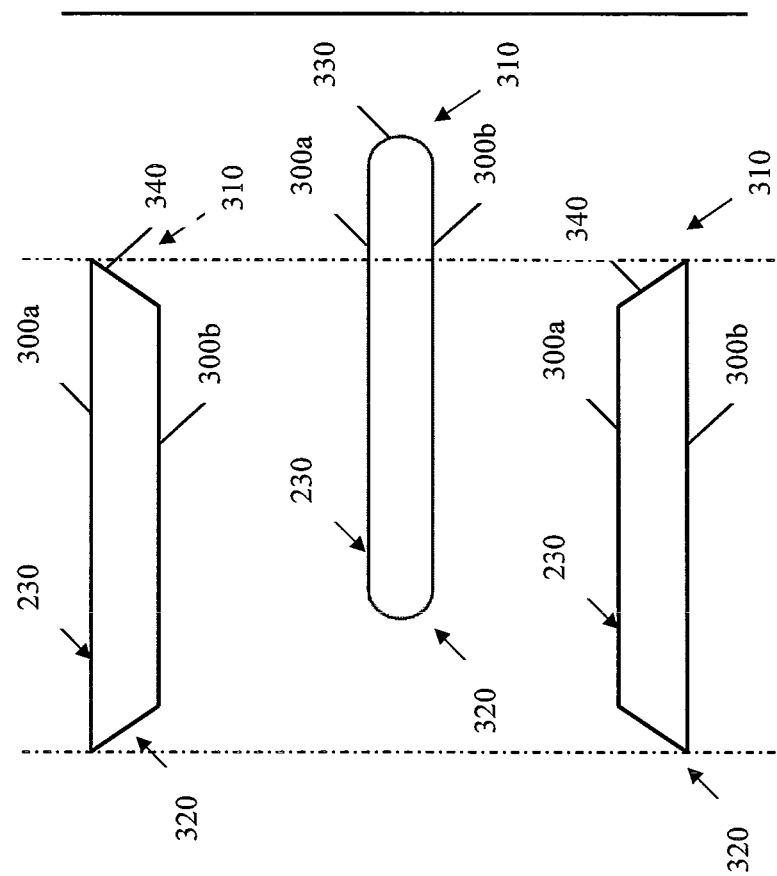

ically, to turbomachines and, more particularly, to a stationary vane arrangement for a turbomachine adapted for reducing rotor blade and/or disk excitation by homogenizing the gas flow stream, both for flow and acoustic pulsations, as well as reducing the effect of vortices shed-off the stationary vanes.

TURBOMACHINERY STATIONARY VANE ARRANGEMENT FOR DISK AND BLADE EXCITATION REDUCTION AND PHASE CANCELLATION

BACKGROUND OF THE INVENTION

Field of the Invention

The present disclosure relates, generally, to turbomachines and, more particularly, to a stationary vane arrangement for a turbomachine adapted for reducing rotor blade and/or disk excitation by homogenizing the gas flow stream, both for flow and acoustic pulsations, as well as reducing the effect of vortices shed-off the stationary vanes.

Description of the Related Art

Turbomachines, such as centrifugal flow compressors, axial flow compressors, and turbines may be utilized in various industries. Centrifugal flow compressors and turbines, in particular, have a widespread use in power stations, jet engine applications, gas turbines, and automotive applications. Centrifugal flow compressors and turbines are also commonly used in large-scale industrial applications, such as air separation plants and hot gas expanders used in the oil refinery industry. Centrifugal compressors are further used in large-scale industrial applications, such as refineries and chemical plants.

With reference to FIG. 1, a multi-stage, centrifugal-flow turbomachine 10 is illustrated in accordance with a conventional design. In some applications, a single stage may be utilized. Such turbomachine 10 generally includes a shaft 20 rotatably supported within a housing 30 by a pair of bearings 40. Turbomachine 10 shown in FIG. 1 includes a plurality of stages to progressively increase the fluid pressure of the working fluid. Each stage is successively arranged along the longitudinal axis of turbomachine 10 and all stages may or may not have similar components operating on a same principle.

With continuing reference to FIG. 1, an impeller 50 includes a plurality of rotating blades 60 circumferentially arranged and attached to an impeller hub 70 which is in turn attached to shaft 20. Blades 60 may be optionally attached to a cover disk 65. A plurality of impellers 50 may be spaced apart in multiple stages along the axial length of shaft 20. Rotating blades 60 are fixedly coupled to impeller hub 70 such that rotating blades 60 along with impeller hub 70 rotate with the rotation of shaft 20. Rotating blades 60 rotate downstream of a plurality of stationary vanes or stators 80 attached to a stationary tubular casing. The working fluid, such as a gas mixture, enters and exits turbomachine 10 in the axial direction of shaft 20. Energy from the working fluid causes a relative motion of rotating blades 60 with respect to stators 80. In a centrifugal compressor, the cross-sectional area between rotating blades 60 within impeller 50 decreases from an inlet end to a discharge end, such that the working fluid is compressed as it passes across impeller 50.

Referring to FIG. 2, working fluid, such as a gas mixture, moves from an inlet end 90 to an outlet end 100 of turbomachine 10. A row of stators 80 provided at inlet end 90 channels the working fluid into a row of rotating blades 60 provided at outlet end 100 of turbomachine 10. Stators 80 extend within the casing for channeling the working fluid to rotating blades 60. Stators 80 are spaced apart circumferentially with equal spacing between individual struts around the perimeter of the casing. A diffuser 110 is provided at the outlet of rotating blades 60 for homogenizing the fluid flow coming off rotating blades 60. Diffuser 110 optionally has a plurality of diffuser vanes 120 extending within a casing. Diffuser blades 120 are spaced apart circumferentially with equal spacing between individual diffuser blades 120 around the perimeter of the diffuser casing. In a multi-stage turbomachine 10, a plurality of return channel vanes 125 are provided at outlet end 100 of turbomachine 10 for channeling the working fluid to rotating blades 60 of the next successive stage. In such embodiment, the return channel vanes 125 provide the function of stators 80 from the first stage of turbomachine 10. The last impeller in a multi-stage turbomachine typically only has a diffuser, which may be provided with or without the diffuser vanes. The last diffuser channels the flow of working fluid to a discharge casing (volute) having an exit flange for connecting to the discharge pipe. In a single-stage embodiment, turbomachine 10 includes stators 80 at inlet end 90 and diffuser 110 at outlet end 100.

With reference to FIG. 3, a schematic view of a plurality of stators 80 is illustrated. Each stator 80 has a pair of opposing longitudinal surfaces 130a, 130b oriented substantially parallel to each other. Stators 80 are desirably oriented at a same angle with respect to a longitudinal axis of turbomachine 10. Each stator 80 has a trailing edge 140 provided at its downstream end and a leading edge 150 provided at its upstream end. Trailing edge 140 of each stator 80 is shaped identically to trailing edge 140 of an adjacent stator 80. For example, trailing edges 140 may have a pointed profile ending in a rounded point. Similarly, leading edges 150 of each stator 80 may have shapes that corresponds to trailing edges 140. Leading edges 150 of each diffuser blade 120 (not shown) are desirably formed identical to trailing edges 140. For example, similar to trailing edges 140 of stator 80, leading edges of diffuser blades 120 may have a pointed profile ending in a rounded point.

An important concern in designing turbomachines is controlling the vibration of the rotating blades and the hub throughout the operating range of the turbomachine. Rotating blades and disks in turbomachinery are excited into resonant vibrations by a) upstream stator strut and/or vane wakes and potential flow interaction with downstream struts and vanes, b) other inhomogeneities in the flow stream formed by non-uniform circumferential pressure distribution, c) acoustic pulsations either at rotating blade passing frequency and/or d) vortex shedding from stationary vanes, in turn causing coincident acoustic resonance of the gas within the casing. For example, Tyler/Sofrin modes may occur due to sound waves at blade passing frequency reflecting off vanes giving spinning modes. (Ref. Tyler, J. M., and Sofrin, T. G., 1962, "Axial Flow Compressor Noise Studies", SAE Transactions, Vol. 70, pp. 309-332.) The acoustic pulsations reflect differently off of the stator struts set back further from the impeller and reduce the effective amplitude of the spinning modes. For example, in an impeller having 15 rotating blades and 20 stator struts, there is a 5-diameter spinning mode. If the 5-diameter structural mode is equal to 20 times the rotating speed, the blade excitation can be lowered by setting half of the stator struts downstream about one-half an acoustic wave length, as wave reflections would result in phase cancellation.

These excitations cause cyclic stress, resulting in potential high cycle fatigue and failure in impellers either at rotating blades, the hub, or the cover. The impeller components can be excited to a large amplitude when a blade modal frequency corresponds to shaft rotational frequency multiplied by the harmonic number of the flow inhomogeneity seen by blades. Typically, the number of resonances with amplitude large enough to cause high cycle fatigue is limited. Since the damage rate from fatigue occurs only if infinite endurance strength of the material is breached, a modest reduction in the vibration amplitude often will eliminate high cycle fatigue as the limiting factor for blade and disk life.

One current practice to overcome these problems is to avoid operation at the resonant frequency by changing the speed rapidly when a resonance is encountered, thereby minimizing the number of fatigue cycles that a blade accumulates during operation. If the number of vibration cycles is minimized, then blade failure is controlled by mechanisms other than downstream wakes, acoustic pulsations, flow inhomogenities, or vortex shedding. However, this practice places undesirable limits on operation of turbomachinery.

Another current approach is to reduce the spatial variations in the flow field by directly injecting air into low-velocity wakes behind obstructions (Rao, N. M., Feng, J., Burdisso, R. A, and Ng, W. F., "Active Flow Control to Reduce Fan Blade Vibration and Noise", 5.sup.th AIAA/CEAS Aeroacoustic Conference, American Institute of Aeronautics and Astronautics, May 10-12, 1999). This approach requires the use of either air from the compressor or from an additional external air source in relatively large quantities. Use of compressor air has a detrimental impact on performance. The addition of a separate air supply adds weight and requires power. Both methods have detrimental impacts on performance. Also, wake filling does not address modal excitation due to bow waves from downstream flow obstructions.

Within the prior art, a number of approaches have been proposed for reducing vibration amplitude of rotating blades and/or providing noise abatement. U.S. Patent Application Publication No. 2007/0274826 to Kuhnel et al. discloses a diffuser for a compressor impeller. FIG. 1 of the Kuhnel et al. publication discloses a diffuser structure that includes guide blades that are each formed of two component blades. The first component blade has an inlet edge and the second component blade has an inlet edge stepped back from another inlet edge. FIG. 2 shows another embodiment wherein a third component blade is provided between component blades. The stepped inlet edges are provided for noise abatement.

U.S. Pat. No. 7,189,059 to Barton et al. discloses a compressor with an inlet shroud situated about an impeller. The shroud, as shown in FIG. 2, includes a plurality of spaced apart vanes or struts with strut tips. As shown in FIG. 6, the struts are configured to vary in thickness between a first end and the strut tip. This variation in thickness is implemented as a linear taper between the strut first ends and the strut tips to increase the natural frequencies of the struts.

U.S. Pat. No. 6,439,838 to Crall et al. describes the use of variable circumferential spacing of the vanes in an axial flow turbomachine to achieve reduced vibratory excitation.

Clark, J., "Design Strategies to Mitigate Unsteady Forcing (Preprint)", AFRL-RZ-WP-TP-2008-2112 discusses the state of the art used for reduction of excitation to rotating blades including the use of a different number of stationary vanes in the upper and lower two halves of a machine having a horizontally split arrangement.

However, none of the prior art designs are directed to a stationary vane arrangement adapted for reducing rotor blade excitation by dehomogenizing the successive wakes within the flow stream and reducing the effect of vortices shed-off the vanes, in addition to reducing acoustic pressure pulsations and direct pressure loads on the rotating blades.

SUMMARY OF THE INVENTION

In accordance with one embodiment, a stationary vane arrangement is provided for guiding a working fluid from an inlet end of a turbomachine to an outlet end. The stationary vane arrangement includes at least one row of a plurality of stationary vanes extending radially inwardly from a casing in a circumferential spacing around the perimeter of the casing. Each stationary vane has a leading edge opposite a trailing edge and opposing longitudinal surfaces extending between the leading edge and the trailing edge. The trailing edges of a first portion of the stationary vanes may have a first end profile and the trailing edges of a second portion of the stationary vanes may have a second end profile different from the first end profile. The stationary vanes may be arranged such that stationary vanes having the first end profile are provided between stationary vanes having the second end profile to minimize fundamental wake passing frequencies downstream of the trailing edges.

According to another embodiment, the first end profile may have a substantially rounded end and the second end profile may have a tapered end that is angled with respect to the opposing longitudinal surfaces of the strut. In another embodiment, the first end profile may have a tapered end that is angled in a first direction with respect to the opposing longitudinal surfaces of the strut and the second end profile may have a tapered end that is angled in a second direction with respect to the opposing longitudinal surfaces.

In accordance with a further embodiment, the plurality of stationary vanes may be provided at an inlet end of a turbomachine. The stationary vanes may be configured for directing a working fluid to a row of rotating blades downstream from the plurality of stationary vanes. The plurality of stationary vanes may be spaced apart circumferentially around a perimeter of the casing at an equal distance from each other about a longitudinal axis extending through the casing. The stationary vanes may be oriented in a same angular position with respect to a longitudinal axis extending through the casing. In one embodiment, the plurality of stationary varies may have a linear profile. In another embodiment, the plurality of stationary vanes may have a streamlined profile.

According to yet another embodiment, a rotor having a plurality of rotating blades may be provided downstream from the plurality of stationary vanes, such that the plurality of stationary vanes is adapted for directing a working fluid to the plurality of rotating blades. Additionally, a diffuser optionally having a plurality of diffuser vanes may be provided downstream of the plurality of rotating blades, extending radially inwardly from the casing in a circumferential spacing around the perimeter of the casing. When provided, each diffuser vane will have a leading edge opposite a trailing edge and opposing longitudinal surfaces extending between the leading edge and the trailing edge. The leading edges of a first portion of the diffuser vanes may have a first end profile and the leading edges of a second portion of the diffuser vanes may have a second end profile different from the first end profile. The diffuser vanes may be arranged such that diffuser vanes having the first end profile are provided adjacent to diffuser vanes having the second end profile.

In accordance with a further embodiment, the plurality of diffuser vanes may be spaced apart circumferentially around a perimeter of the casing at an equal distance from each other about a longitudinal axis extending through the casing. The diffuser vanes may be oriented in a same angular position with respect to a longitudinal axis extending through the casing. In one embodiment, the plurality of diffuser vanes may have a linear profile. In another embodiment, the diffuser vanes may have a streamlined profile.

According to another embodiment, a turbomachine may have a casing having an inlet end opposite an outlet end along a longitudinal axis of the casing. A shaft assembly is provided within the casing, the shaft assembly extending between the inlet and outlet ends. Furthermore, a rotor having a plurality of rotating blades may extend radially outward from the shaft assembly. Additionally, a stationary vane arrangement is provided upstream of the rotor. The stationary vane arrangement may include at least one row of a plurality of stationary vanes extending radially inwardly from the casing in a circumferential spacing around the perimeter of the casing. Each stationary vane may have a leading edge opposite a trailing edge and opposing longitudinal surfaces extending between the leading edge and the trailing edge. The trailing edges of a first portion of the stationary vanes may have a first end profile and the trailing edges of a second portion of the stationary vanes may have a second end profile different from the first end profile. The stationary vanes may be arranged such that stationary vanes having the first end profile are provided adjacent to the stationary vanes having the second end profile.

According to another embodiment, the plurality of stationary vanes may be provided at an inlet end of the turbomachine and may be configured for directing a working fluid to a row of rotating blades downstream from the plurality of stationary vanes. In this embodiment, the plurality of stationary vanes may be oriented in a same angular position with respect to a longitudinal axis extending through the casing. According to one embodiment, the plurality of stationary vanes may have a linear profile. Alternately, the plurality of stationary vanes may have a streamlined profile. Additionally, a plurality of diffuser vanes may be provided downstream of the plurality of rotating blades, extending radially inwardly from the casing in a circumferential spacing around the perimeter of the casing. Each diffuser vane may have a leading edge opposite a trailing edge and opposing longitudinal surfaces extending between the leading edge and the trailing edge. The leading edges of a first portion of the diffuser vanes may have a first end profile and the leading edges of a second portion of the diffuser vanes may have a second end profile different from the first end profile. The diffuser vanes may be arranged such that diffuser vanes having the first end profile are provided adjacent to diffuser vanes having the second end profile.

These and other features and characteristics of the turbomachine, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIGS. 5A-5C show schematic views of stationary vane arrangements according to two embodiments of the present invention.

DETAILED DESCRIPTION OF THE INVENTION

Figure 1:
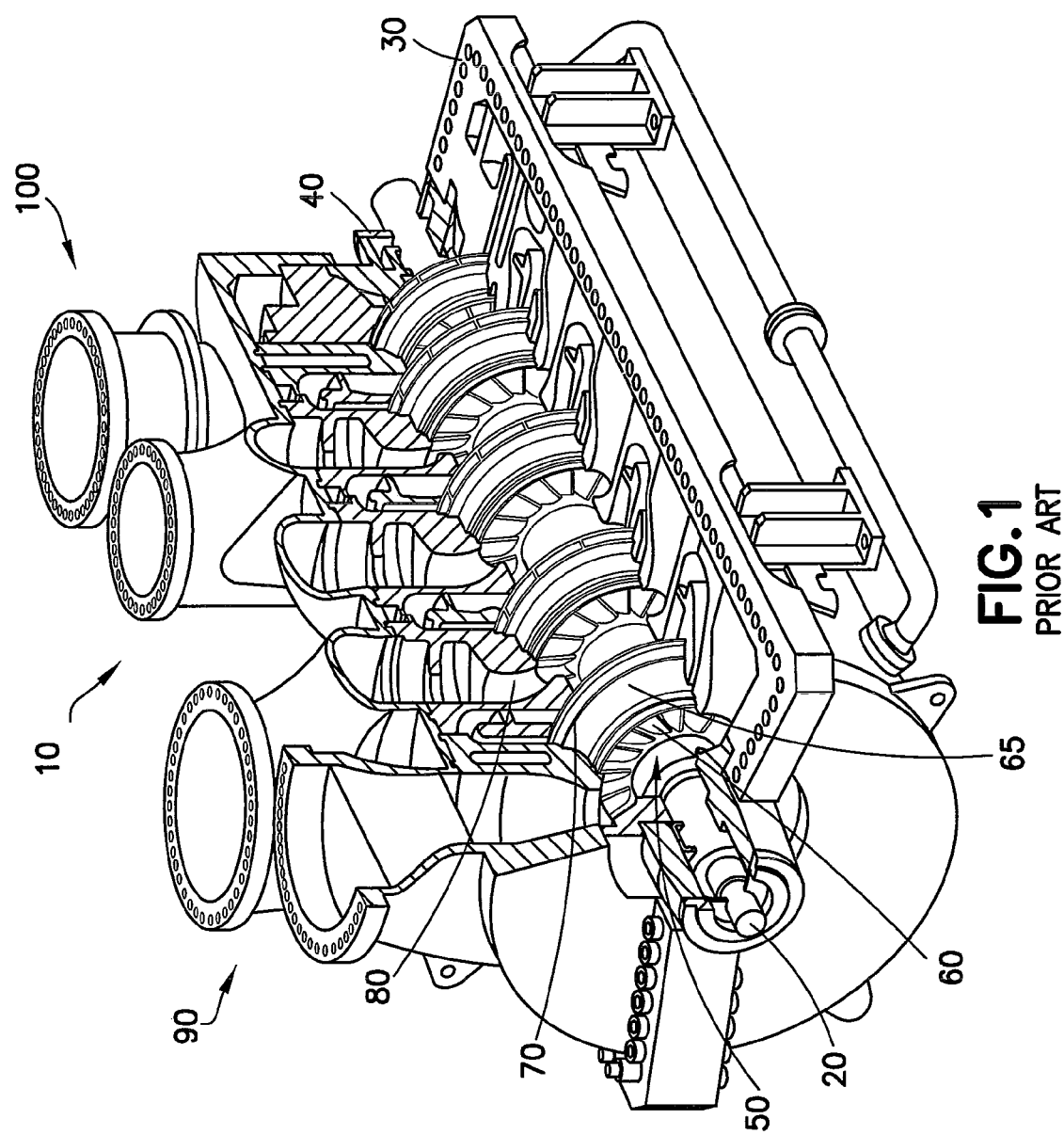
FIG. 1 is a partial-cutaway perspective view of a multi-stage, centrifugal-flow turbomachine in accordance with a prior art embodiment.
Figure 2:
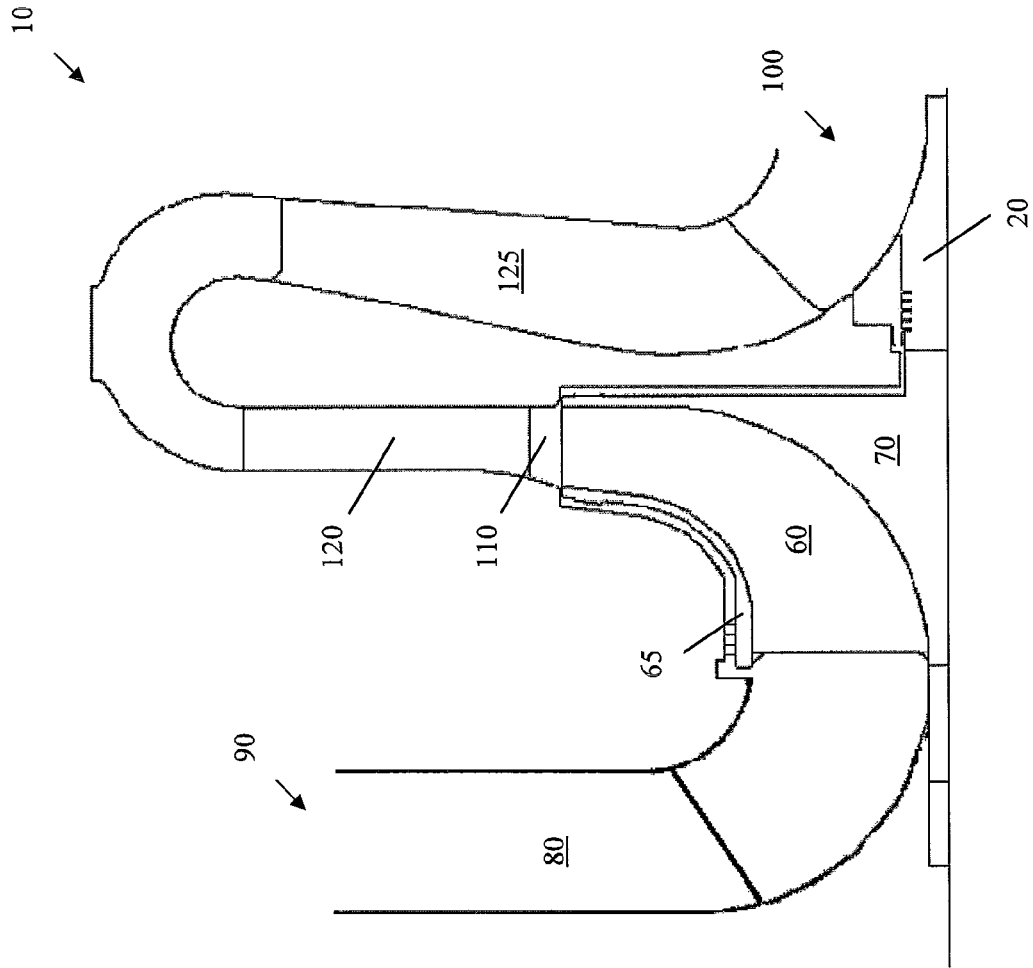
FIG. 2 is a schematic cross-sectional view of one stage of the turbomachine shown in FIG. 1.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As described above, rotating blades 60 in a conventional turbomachine 10 are excited into resonant vibrations by a) upstream stator strut and/or vane wakes and potential flow interaction with downstream struts and vanes, b) other inhomogeneities in the flow stream formed by non-uniform circumferential pressure distribution, c) acoustic pulsations either at rotating blade passing frequency and/or from vortex shedding from struts or vanes, in turn causing coincident acoustic resonance of the gas within the casing. Rotating blades 60 can be excited to a large amplitude when a blade modal frequency corresponds to the shaft rotational frequency multiplied by the harmonic number of the flow inhomogeneity seen by the rotating blade 60.

In order to overcome these deficiencies of the prior art, the present invention provides a stationary vane arrangement adapted for homogenizing the flow into the rotating blades to reduce the destructive forces and increase the application range. The present invention provides a stationary vane arrangement adapted for reducing rotor blade and/or disk excitation by homogenizing the gas flow stream, both for flow and acoustic pulsations, as well as reducing the effect of vortices shed-off the stationary vanes.

Figure 4:
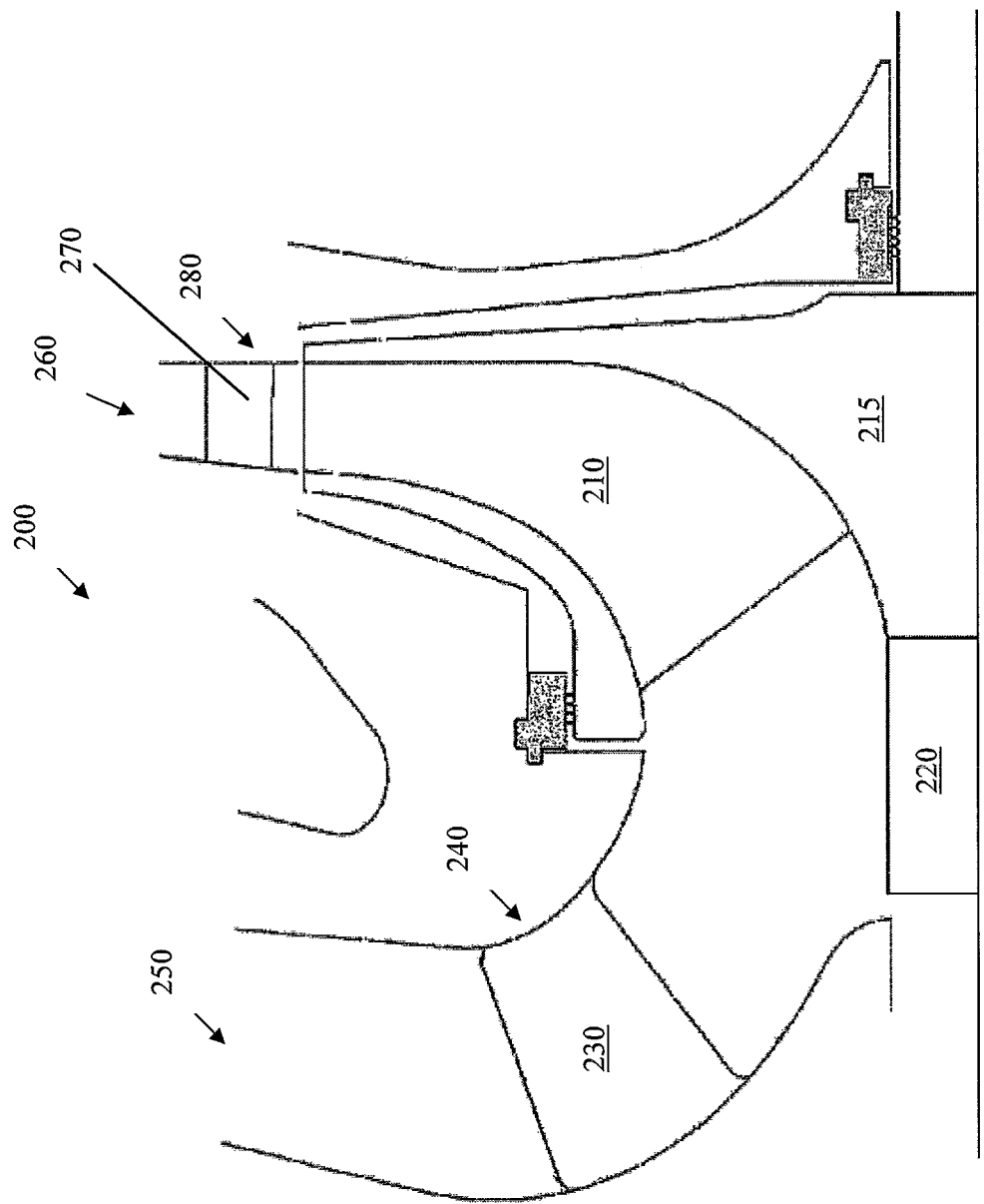
FIG. 4 is a schematic cross-sectional view along a longitudinal axis of one stage of a multi-stage, centrifugal flow turbomachine according to one embodiment of the present invention.

With reference to FIG. 4, a turbomachine 200 includes a stationary vane arrangement adapted for reducing or eliminating resonant vibrations caused by inhomogeneities in the flow stream due to vortex shedding at the trailing edge of stator struts. FIG. 4 illustrates a single stage of a turbomachine 200; however, one of ordinary skill in the art will understand that specific components illustrated in FIG. 4 can be easily adapted for use in multi-stage turbomachines, such as a multi-stage, centrifugal-flow compressor.

With continuing reference to FIG. 4, turbomachine 200 includes a plurality of rotating blades 210 circumferentially arranged around a disk 215 that is rotatable with shaft 220. In an embodiment where turbomachine 200 has multiple stages (not shown), rotating blades 210 are disposed in multiple stages along the axial length of shaft 220. In another embodiment, rotating blades 210 may be fixedly coupled to shaft 220 such that rotating blades 210 rotate with the rotation of shaft 220. Rotating blades 210 rotate adjacent to a plurality of stationary vanes 230 (i.e., stationary vane arrangement) attached to a stationary tubular casing 240. Working fluid, such as gas mixture, moves from an inlet end 250 to an outlet end 260 of turbomachine 200. A row of stationary vanes 230 provided at inlet end 250 channels the working fluid into a row of rotating blades 210 at outlet end 260 of turbomachine 200. The number of stationary vanes 230 may correspond to the number of rotating blades 210. Alternatively, the number of stationary vanes 230 may be higher or lower than the number of rotating blades 210. Desirably, the number of rotating blades 210 is not equal to the number of stationary vanes 230 in order to remove circular and torsional modes when all blades vibrate in-phase along a circular line. Stationary vanes 230 may have an even or odd number of individual vanes. Due to aerodynamic concerns, stationary vanes 230 are desirably provided proximate to rotating blades 210 to enhance mixing and reduce effect of vortices shed off of the vanes. This arrangement reduces acoustic pressure pulsations and direct pressure loads on rotating blades 210.

Diffuser 280, along with optional diffuser vanes 270, is provided at the outlet of rotating blades 210 for homogenizing the fluid flow coming off rotating blades 210. Diffuser 280 is desirably provided at outlet end 260 of turbomachine 200. Each diffuser 280 optionally has one or more diffuser vanes 270 extending across a casing for channeling the working fluid to stationary vanes 230 of the next successive stage. Diffuser vanes 270 are desirably spaced apart equally around the circumference of the diffuser casing.

Stationary vanes 230 extend across an interior portion of stationary casing 240 for directing the working fluid to rotating blades 210. Stationary vanes 230 are spaced apart circumferentially with equal spacing between individual vanes around the perimeter of stationary casing 240 for ensuring desirable aerodynamic performance. In order to overcome the deficiency of the prior art design that leads to the creation of fundamental wake passing frequencies downstream of the trailing edges of conventional struts, the present invention incorporates a stationary vane arrangement adapted for reducing vibratory excitation of one or more of the resonant vibratory modes of the rotating blades as the turbomachine is operated over various operating speeds.

Figure 5A:
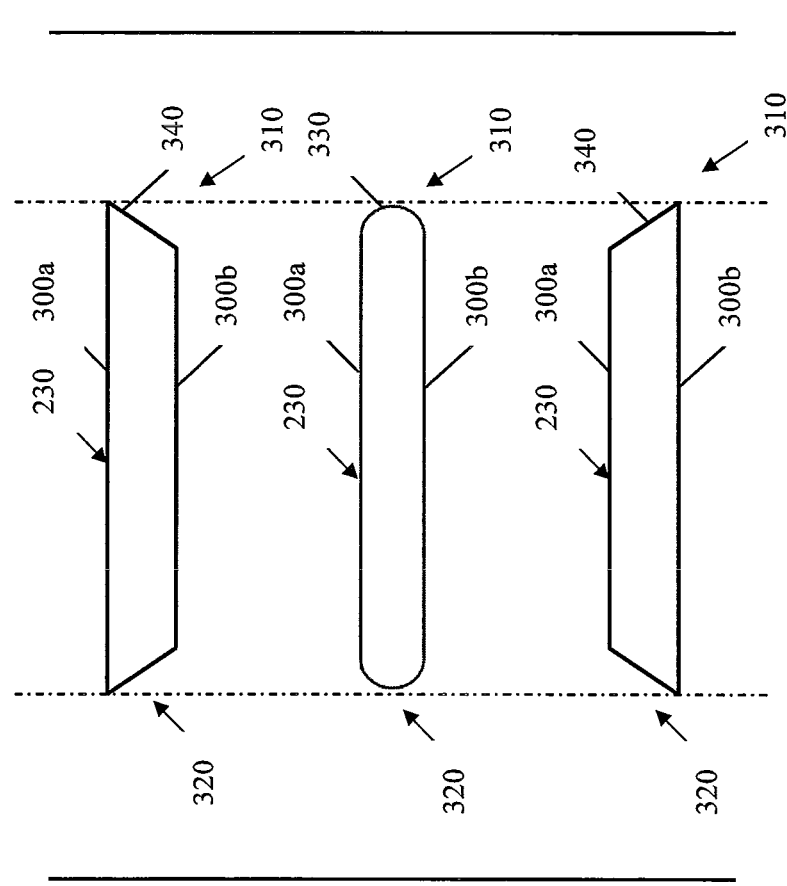
Figure 5C:
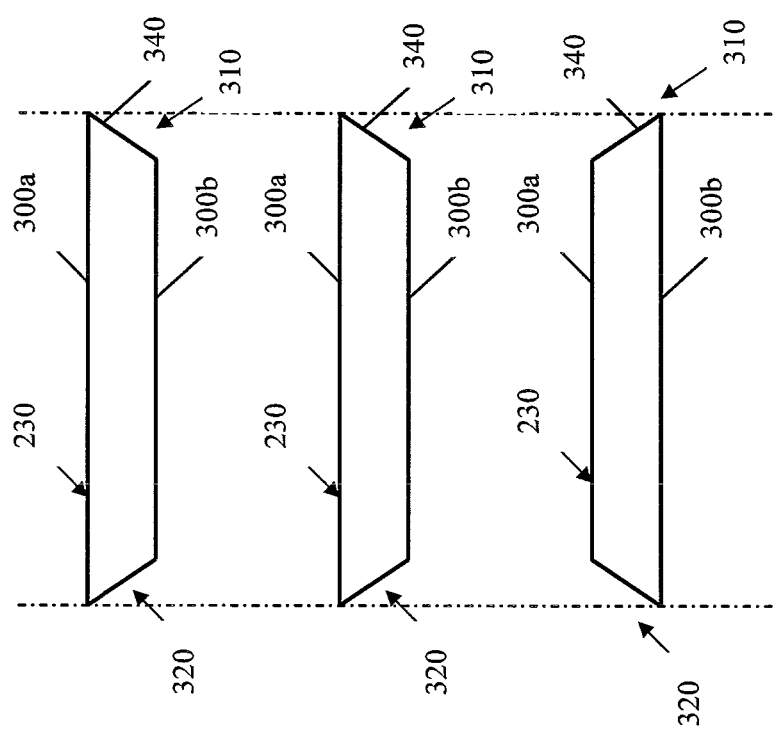

With reference to FIGS. 5A-5C, various configurations of stationary vane arrangements are shown in accordance with a plurality of embodiments of the present invention. Each of the FIGS. 5A-5C shows a schematic view of a plurality of stationary vanes 230. In each embodiment, stationary vanes 230 have a pair of opposing longitudinal surfaces 300a, 300b. As shown in FIGS. 5A-5C, opposing longitudinal surfaces 300a, 300b of each stationary vane 230 are substantially linear and substantially parallel to each other. In alternate embodiments, opposing longitudinal surfaces 300a, 300b of each stationary vane 230 may be streamlined to have a specific aerodynamic profile.

Each stationary vane 230 has a trailing edge 310 provided at its downstream end and a leading edge 320 provided at its upstream end. In contrast to the prior art designs where the trailing edge of each stationary vane is shaped identically to each adjacent trailing edge, stationary vanes 230, shown in FIGS. 5A-5C, include a modified design for reducing or cancelling out the forces generated by the stator wake to reduce the vibratory excitation of one or more of the resonant vibratory modes of the rotating blades 210.

Figure 3:
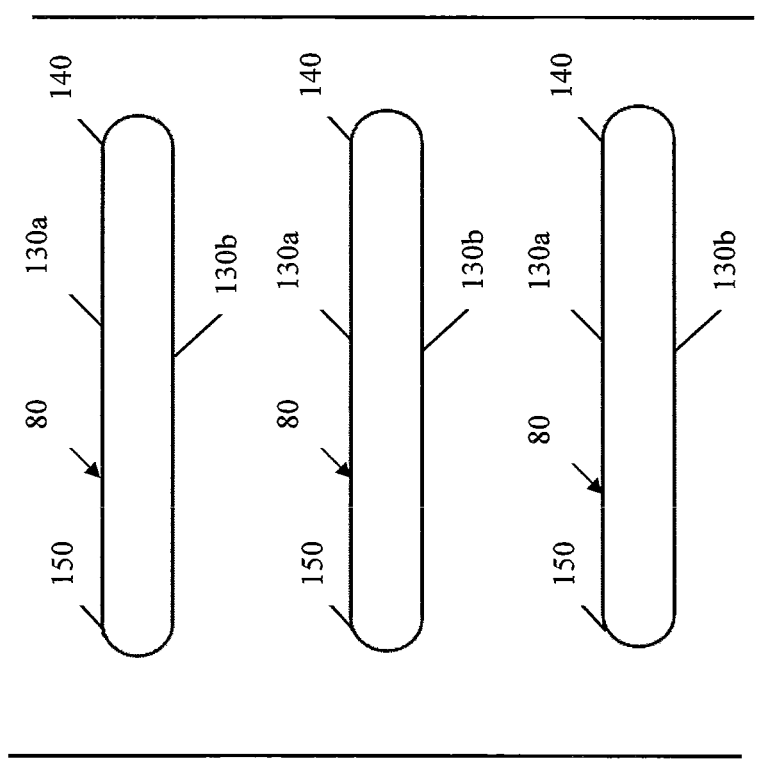
FIG. 3 is a schematic view of a plurality of stators in accordance with a prior art embodiment.

With specific reference to FIG. 5A, stationary vanes 230 having an alternating pattern of trailing edges 310 and leading edges 320 are shown for a stator having an odd number of stationary vanes 230. In one preferred and non-limiting embodiment, stationary vanes 230 are grouped into groups of two or three to alternate the homogenized wake pattern. For example, a stator having 21 stationary vanes 230 arranged as indicated in FIG. 5A has a repeating pattern of groups of three stationary vane sets. Stationary vanes 230 are desirably positioned with equal radial separation between adjacent vanes. Additionally, all stationary vanes 230 are arranged at a same longitudinal position within the stationary casing 240 such that all stationary vanes 230 are equally distanced from rotating blades 210 (not shown in FIG. 5A). Stationary vanes 230 are arranged such that a first half of stationary vanes 230 have trailing edges 310 and leading edges 320 that terminate at a substantially rounded end 330, similar to stationary vanes 80 shown in FIG. 3. The second half of stationary vanes 230 of the stationary vane arrangement shown in FIG. 5A have trailing edges 310 and leading edges 320 terminating at a tapered end 340. The two types of stationary vanes 230 are arranged such that each stationary vane 230 having a rounded end 330 is positioned between stationary vanes 230 having tapered end 340. Tapered end 340 is formed by cutting a part of one longitudinal surface 300a, 300b at an angle with respect to the opposing longitudinal surface 300a, 300b. Trailing edge 310 and leading edge 320 of each stationary vane 230 may have tapered end 340 tapering in a same direction or opposing directions, as shown in FIG. 5A.

Leading edges of each diffuser vane (not shown) are desirably formed in a similar manner. For example, leading edges of each diffuser vane may have an alternating pattern where some diffuser vanes have a leading edge that is substantially rounded while the remaining diffuser vanes have tapered leading edges.

With specific reference to FIG. 5B, stationary vanes 230 having an alternating pattern of trailing edges 310 and leading edges 320 are shown for a stator having an even number of stationary vanes 230. Similar to the embodiment shown in FIG. 5A, stationary vanes 230 are grouped into groups of two or three to alternate the homogenized wake pattern. For example, a stator having 20 stationary vanes 230 arranged as indicated in FIG. 5B has a repeating pattern of groups of two stationary vane pairs. Stationary vanes 230 are desirably positioned with equal radial separation between adjacent vanes. Additionally, stationary vanes 230 are arranged in an alternating offset longitudinal position within the stationary casing 240 such that some stationary vanes 230 are closer to rotating blades 210 (not shown in FIG. 5A) than other stationary vanes 230. Stationary vanes 230 are arranged such that the first half of stationary vanes 230 have trailing edges 310 and leading edges 320 that terminate at a substantially rounded end 330, similar to stationary vanes 230 shown in FIG. 5A. The second half of stationary vanes 230 of the stationary vane arrangement shown in FIG. 5B have trailing edges 310 and leading edges 320 terminating at a tapered end 340, similar to the stationary vane arrangement shown in FIG. 5A. The two types of stationary vanes 230 are arranged such that each stationary vane 230 having a rounded end 330 is positioned between stationary vanes 230 having tapered end 340. Stationary vanes 230 having rounded end 330 are set back longitudinally relative to stationary vanes 230 having tapered end 340. In this arrangement, stationary vanes 230 having rounded end 330 are located closer to rotating blades 210 (not shown in FIG. 5B) than stationary vanes 230 having tapered end 340. Tapered end 340 is formed by cutting a part of one longitudinal surface 300a, 300b at an angle with respect to the opposing longitudinal surface 300a, 300b. Trailing edge 310 and leading edge 320 of individual stationary vane 230 may have tapered end 340 tapering in a same direction or opposing directions, as shown in FIG. 5B.

With specific reference to FIG. 5C, stationary vanes 230 having an alternating pattern of trailing edges 310 and leading edges 320 are shown for a stator having an even number of stationary vanes 230 in accordance with another embodiment. Similar to other embodiments, stationary vanes 230 are grouped into groups of two or three to alternate the homogenized wake pattern. For example, a stator having 20 stationary vanes 230 arranged as indicated in FIG. 5C has a repeating pattern of groups of two stationary vane pairs. Stationary vanes 230 are desirably positioned with equal radial separation between adjacent vanes. Additionally, all stationary vanes 230 are arranged at a same longitudinal position within the stationary casing 240 such that all stationary vanes 230 are equally distanced from rotating blades 210 (not shown in FIG. 5C). All stationary vanes 230 of the stationary vane arrangement shown in FIG. 5C have trailing edges 310 and leading edges 320 terminating at a tapered end 340. Tapered end 340 is formed by cutting a part of one longitudinal surface 300a, 300b at an angle with respect to the opposing longitudinal surface 300a, 300b. In this embodiment, tapered ends 340 are arranged such that they are inclined at mutually opposing angles. In other words, stationary vanes 230 are arranged such that tapered ends 340 are alternately cut between adjacent stationary vanes 230. In a similar manner, leading edges of each diffuser vane (not shown) are desirably formed in a similar manner. For example, leading edges of each diffuser vane may have an alternating pattern where diffuser vanes have mutually-opposed tapered leading edges.

The above-described stationary vane arrangements are adapted for reducing the excitation of rotating blades 210 and disk 215 by dehomogenizing the successive wakes within the flow stream and reducing the effect of acoustic pulsations and vortices shed-off stationary vanes 230. The creation of excitation at fundamental wake passing frequencies downstream of trailing edges 310 of the stationary vanes 230 is minimized, thereby reducing the vibratory response of one or more of the resonant vibratory modes of the rotating blades as the turbomachine is operated over various operating speeds. In addition, response to acoustic excitation is mitigated by the stationary vane arrangements described above.

To determine whether forces generated by the wakes coming off stationary vanes 230 cancel each other for the entire rotor at a given operating speed, the number of rotating blades 210 on the rotor is considered with regard to the number of stationary vanes 230 interacting with the rotating blades 210. For example, for a disk 215 or coupled blade structural mode, such as a five-diameter mode in a 15-bladed impeller, exciting forces shedding off stationary vanes 230 cancel for all stationary vane arrangements except for a 10-vaned or 20-vaned stator. Forces do not cancel if the natural frequency is equal to 10 times the operating speed with a 10-bladed stator, or with either a 10- or 20-bladed stator if the structural frequency is equal to 20 times the operating speed. The parametric equations illustrating embodiments where phase cancellation cannot be achieved are represented as follows:

Not at Disk Critical Speeds:     Equation (1)
(a) $|y \cdot S| \pm |z \cdot B| = n$
(b) $y \cdot S = h$
(c) $f_r = y \cdot S \cdot \omega$ -continued At Disk Critical Speeds:     Equation (2)
(a) For $B > 1$
(b) $y \cdot S = h = n$
(c) $f_r = n \cdot \omega$ where:
$B$ = number of rotating blades
$S$ = number of stationary elements
$f_r$ = natural frequency at speed, Hz
$h$ = harmonic of speed
$n$ = number of diameter nodal lines
$y$ & $z$ = integers > 0
$\omega$ = rotating speed, Hz Non-homogenous flow downstream of the stationary vane arrangement can be caused by a plurality of factors relating to the spinning modes of acoustic pressure pulsations at rotating blade passing frequency. The interaction of rotating blades 210 both upstream and downstream of stationary vanes 230 affects acoustic pulsations at rotating blade passing frequency. In general, reflecting acoustic waves are generated within disk 215 having a diametral pattern with the number of diameters equal to an absolute value of the difference between the number of rotating blades 210 and stationary vanes 230. For example, in a turbomachine 200 with 15 rotating blades 210 and 10 upstream stationary vanes 230, there is a 5-diameter spinning acoustic mode (|15−10|=5). Similarly, a 5-diameter spinning acoustic mode is also present in a turbomachine 200 having 15 rotating blades 210 and 20 upstream stationary vanes 230 (|15−20|=5). The excitation frequency causes resonance if 20 times rotating speed is equal to a 5-diameter disk or blade coupled mode frequency. In both cases, the spinning mode relative to rotating blades 210 occurs at a frequency equal to 15 times the rotating speed. This acoustic interaction excitation is normally only of concern if the same diametral pattern acoustic mode of the gas is simultaneously coincident with rotating blade passing frequency, at the resonant speed of the spinning mode within the rotating element. Another acoustic excitation of gas modes can be caused by vortex shedding frequency from the trailing edges of stationary vanes 230. In turn, the acoustic mode frequency with the same mode shape, i.e., number of diameters, could be at a resonant speed if equal to a disk or blade coupled mode frequency plus or minus the number of diameters times shaft speed. Axial flow turbomachines typically have a low risk of blade/vane interaction resonance for disk modes because of the relatively high numbers used in the above equations and the high difference between the number of rotating blades and stationary vanes. Accordingly, any design that has a disk critical speed or interaction resonance below operating speed has a limited number of resonance cycles while traversing low speeds. Nonetheless, all of these three potential sources of excitation can be mitigated by the proper selection of the number of rotating blades 210 and design of stationary vanes 230 in accordance with the embodiments described herein.

While the above-described stationary vane arrangement has been described with reference to a turbomachine, such as a compressor, the design is equally applicable to any other turbomachine utilizing bladed disk construction, including, but not limited to, radial-inflow turbines, fans, axial/centrifugal compressors, gas turbines, jet engines, turbo pumps, expanders, cooling flow elements in motors, and generators. Those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A stationary vane arrangement for guiding a working fluid from an inlet end of a turbomachine to an outlet end, the stationary vane arrangement comprising: at least one row of a plurality of stationary vanes extending radially inwardly from a stationary casing in a circumferential spacing around a perimeter of the casing, each stationary vane having a leading edge opposite a trailing edge and opposing longitudinal surfaces extending between the leading edge and the trailing edge, wherein the trailing edges of a first portion of the stationary vanes have a first end profile and the trailing edges of a second portion of the stationary vanes have a second end profile different from the first end profile, wherein the stationary vanes are arranged such that each stationary vane having the first end profile is located between stationary vanes having the second end profile to minimize fundamental wake passing frequencies downstream of the trailing edges, wherein the first end profile comprises a substantially rounded edge and wherein the second end profile comprises a tapered chamfered end that is angled with respect to the opposing longitudinal surfaces of the stationary vane, and wherein a first subset of the second end profile comprises a tapered chamfered end that is angled in a first direction with respect to the opposing longitudinal surfaces of the vane and wherein a second subset of the second end profile comprises a tapered chamfered end that is angled in a second direction with respect to the opposing longitudinal surfaces such that the stationary vanes of the first subset and the stationary vanes of the second subset are positioned on opposing sides of stationary vanes having the first end profile.

2. The stationary vane arrangement according to claim 1, wherein the plurality of stationary vanes is provided at the inlet end of the turbomachine and is configured for directing the working fluid to a row of rotating blades downstream from the plurality of stationary vanes.

3. The stationary vane arrangement according to claim 2, wherein the plurality of stationary vanes is spaced apart circumferentially around a perimeter of the casing at an unequal distance from each other about a longitudinal axis extending through the casing.

4. The stationary vane arrangement according to claim 1, wherein the plurality of stationary vanes is spaced apart circumferentially around the perimeter of the casing at an equal distance from each other about a longitudinal axis extending through the casing.

5. The stationary vane arrangement according to claim 1, wherein the first portion of the plurality of stationary vanes is offset with respect to a longitudinal axis extending through the casing relative to the second portion of the plurality of stationary vanes.

6. The stationary vane arrangement according to claim 1, wherein the plurality of stationary vanes has a linear profile.

7. The stationary vane arrangement according to claim 1, wherein the plurality of stationary vanes has a streamlined profile.

8. The stationary vane arrangement according to claim 1, further comprising a rotor having a plurality of rotating blades provided downstream from the plurality of stationary vanes, wherein the plurality of stationary vanes is configured for directing a working fluid to the plurality of rotating blades.

9. The stationary vane arrangement according to claim 8, further comprising a diffuser having a plurality of diffuser vanes provided downstream of the plurality of rotating blades and extending radially inwardly from the casing in a circumferential spacing around the perimeter of the casing, each diffuser vane having a leading edge opposite a trailing edge and opposing longitudinal surfaces extending between the leading edge and the trailing edge, wherein the leading edges of a first portion of the diffuser vanes have a first end profile and the leading edges of a second portion of the diffuser vanes have a second end profile different from the first end profile, and wherein the diffuser vanes are arranged such that diffuser vanes having a first end profile are provided adjacent to diffuser vanes having a second end profile.

10. The stationary vane arrangement according to claim 9, wherein the plurality of diffuser vanes is spaced apart circumferentially around a perimeter of the casing at an unequal distance from each other about a longitudinal axis extending through the casing.

11. A turbomachine, comprising: a casing having an inlet end opposite an outlet end along a longitudinal axis of the casing; a shaft assembly provided within the casing, the shaft assembly extending between the inlet and outlet ends; a rotor having a plurality of rotating blades extending radially outward from the shaft assembly; and a stationary vane arrangement provided upstream of the rotor, wherein the stationary vane arrangement comprises: at least one row of a plurality of stationary vanes extending radially inwardly from the casing in a circumferential spacing around a perimeter of the casing, each stationary vane having a leading edge opposite a trailing edge and opposing longitudinal surfaces extending between the leading edge and the trailing edge, wherein the trailing edges of a first portion of the stationary vanes have a first end profile and the trailing edges of a second portion of the stationary vanes have a second end profile different from the first end profile, wherein the stationary vanes are arranged such that stationary vanes having the first end profile are provided adjacent to stationary vanes having the second end profile, wherein the first end profile comprises a substantially rounded edge and wherein the second end profile comprises a tapered chamfered end that is angled with respect to the opposing longitudinal surfaces of the stationary vane, and wherein a first subset of the second end profile comprises a tapered chamfered end that is angled in a first direction with respect to the opposing longitudinal surfaces of the vane and wherein a second subset of the second end profile comprises a tapered chamfered end that is angled in a second direction with respect to the opposing longitudinal surfaces such that the stationary vanes of the first subset and the stationary vanes of the second subset are positioned on opposing sides of stationary vanes having the first end profile.

12. The turbomachine according to claim 11, wherein the plurality of stationary vanes is provided at an inlet end of the turbomachine and is configured for directing a working fluid to a row of rotating blades downstream from the plurality of stationary vanes.

13. The turbomachine according to claim 11, wherein the plurality of stationary vanes is oriented in a same angular position with respect to the longitudinal axis extending through the casing.

14. The turbomachine according to claim 11, wherein the plurality of stationary vanes has a linear profile.

15. The turbomachine according to claim 11, wherein the plurality of stationary vanes has a streamlined profile.

16. The turbomachine according to claim 11, further comprising a diffuser having a plurality of diffuser vanes provided downstream of the plurality of rotating blades and extending radially inwardly from the casing in a circumferential spacing around the perimeter of the casing, each diffuser vane having a leading edge opposite a trailing edge and opposing longitudinal surfaces extending between the leading edge and the trailing edge, wherein the leading edges of a first portion of the diffuser vanes have a first end profile and the leading edges of a second portion of the diffuser vanes have a second end profile different from the first end profile, and wherein the diffuser vanes are arranged such that diffuser vanes having a first end profile are provided adjacent to diffuser vanes having a second end profile.

17. The turbomachine according to claim 16, wherein the plurality of diffuser vanes is spaced apart circumferentially around a perimeter of the casing at an equal distance from each other about a longitudinal axis extending through the casing.

18. A turbomachine, comprising: a casing having an inlet end opposite an outlet end along a longitudinal axis of the casing; a shaft assembly provided within the casing, the shaft assembly extending between the inlet and outlet ends; at least one rotor having a plurality of rotating blades extending radially outward from the shaft assembly; at least one stationary vane arrangement corresponding to the at least one rotor, the at least one stationary vane arrangement further comprising: at least one row of a plurality of stationary vanes provided upstream of the at least one rotor and extending radially inwardly from the casing in a circumferential spacing around a perimeter of the casing, each stationary vane having a leading edge opposite a trailing edge and opposing longitudinal surfaces extending between the leading edge and the trailing edge, wherein the trailing edges of a first portion of the stationary vanes have a first end profile and the trailing edges of a second portion of the stationary vanes have a second end profile different from the first end profile, wherein the stationary vanes are arranged such that stationary vanes having the first end profile are provided adjacent to stationary vanes having the second end profile, wherein the first end profile comprises a substantially rounded edge and wherein the second end profile comprises a tapered chamfered end that is angled with respect to the opposing longitudinal surfaces of the stationary vane, and wherein a first subset of the second end profile comprises a tapered chamfered end that is angled in a first direction with respect to the opposing longitudinal surfaces of the vane and wherein a second subset of the second end profile comprises a tapered chamfered end that is angled in a second direction with respect to the opposing longitudinal surfaces such that the stationary vanes of the first subset and the stationary vanes of the second subset are positioned on opposing sides of stationary vanes having the first end profile; and at least one diffuser having a row of a plurality of diffuser vanes provided downstream of the rotor and extending radially inwardly from the casing in a circumferential spacing around the perimeter of the casing, each diffuser vane having a leading edge opposite a trailing edge and opposing longitudinal surfaces extending between the leading edge and the trailing edge, wherein the leading edges of a first portion of the diffuser vanes have a first end profile and the leading edges of a second portion of the diffuser vanes have a second end profile different from the first end profile, and wherein the diffuser vanes are arranged such that diffuser vanes having the first end profile are provided adjacent to diffuser vanes having the second end profile.

\* \* \* \* \*